US010052658B2

(12) United States Patent
Yamane et al.

(10) Patent No.: US 10,052,658 B2
(45) Date of Patent: Aug. 21, 2018

(54) LAMINATED COATING FILM STRUCTURE

(75) Inventors: Takakazu Yamane, Hiroshima (JP); Hiroshi Kubota, Aki-gun (JP); Sakura Nakano, Hiroshima (JP); Takako Ishibashi, Yokosuka (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 13/642,396

(22) PCT Filed: May 13, 2011

(86) PCT No.: PCT/JP2011/002665

§ 371 (c)(1),
(2), (4) Date: Oct. 19, 2012

(87) PCT Pub. No.: WO2011/145303

PCT Pub. Date: Nov. 24, 2011

(65) Prior Publication Data

US 2013/0048501 A1 Feb. 28, 2013

(30) Foreign Application Priority Data

May 18, 2010 (JP) ................................ 2010-114595

(51) Int. Cl.
*C25D 7/00* (2006.01)
*B32B 5/16* (2006.01)
(Continued)

(52) U.S. Cl.
CPC ............... *B05D 7/14* (2013.01); *B05D 5/061* (2013.01); *B05D 7/577* (2013.01)

(58) Field of Classification Search
USPC ...................................................... 428/411.1
See application file for complete search history.

(56) References Cited

U.S. PATENT DOCUMENTS 5,354,794 A * 10/1994 Stevenson et al. ........... 524/100
2007/0071901 A1 3/2007 Avgenaki et al.
(Continued)

FOREIGN PATENT DOCUMENTS

CN 1849416 A 10/2006
CN 101277770 A 10/2008
(Continued)

OTHER PUBLICATIONS

English Translation of JP 2005-169313 (2005).*
(Continued)

*Primary Examiner* — Callie E Shosho
*Assistant Examiner* — Patrick Noland English
(74) *Attorney, Agent, or Firm* — Studebaker & Brackett PC

(57) ABSTRACT

One aspect of the present invention is a laminated coating film structure having a laminated coating film that renders a specific color on a coated object, wherein the laminated coating film is provided with a first layer arranged on the side close to the coated object and containing a pigment in which the mean particle diameter is ½ or more the wavelength of the specific color but 2 um or less, and a second layer arranged on the side far from the coated object and containing a pigment in which the mean particle diameter is 0.05 um or more but less than ½ the wavelength of the specific color.

4 Claims, 6 Drawing Sheets

(51) Int. Cl.

| | |
|---|---|
| ***C25D 9/02*** | (2006.01) |
| ***B05D 7/14*** | (2006.01) |
| ***B05D 5/06*** | (2006.01) |
| ***B05D 7/00*** | (2006.01) |

(56) References Cited

U.S. PATENT DOCUMENTS

| | | | | |
|---|---|---|---|---|
| 2007/0089996 | A1 | 4/2007 | Kojima | |
| 2009/0317629 | A1* | 12/2009 | Wegner | C09D 4/00 428/336 |
| 2011/0045263 | A1 | 2/2011 | Avgenaki et al. | |

FOREIGN PATENT DOCUMENTS

| | | | |
|---|---|---|---|
| EP | 0823289 | A1 | 2/1998 |
| JP | 2005-169313 | A | 6/2005 |
| WO | 1996/033814 | A1 | 10/1996 |

OTHER PUBLICATIONS

International Search Report; PCT/JP2011/002665; dated Aug. 2, 2011.

The first Office Action issed by the State Intellectual Property Office of People's Republic of China on Oct. 30, 2013, which corresponds to Chinese Patent Application No. 201180024511.1 and is related to U.S. Appl. No. 13/642,396; with an English summary.

* cited by examiner

[Fig. 1]
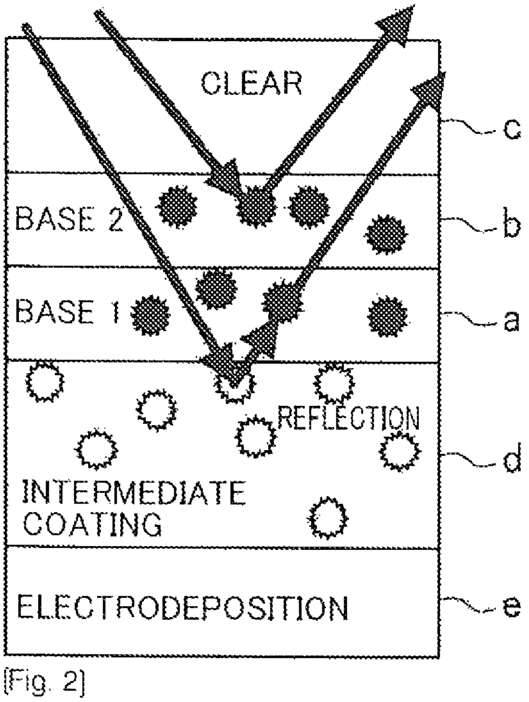
[Fig. 2]
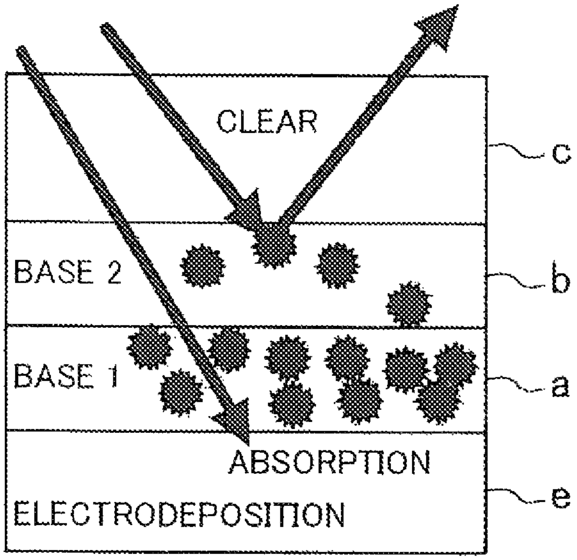

[Fig. 3]
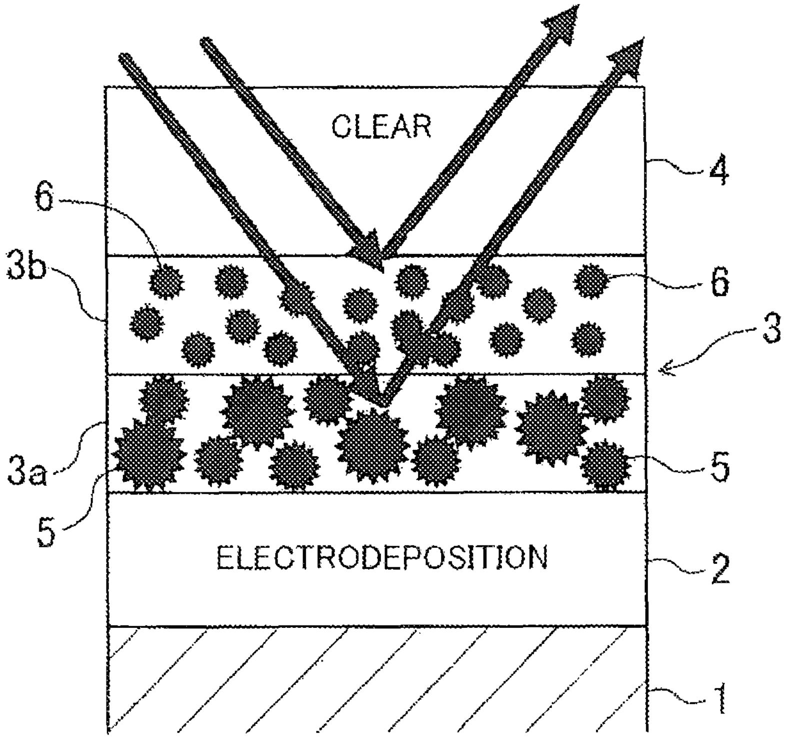

[Fig. 4]
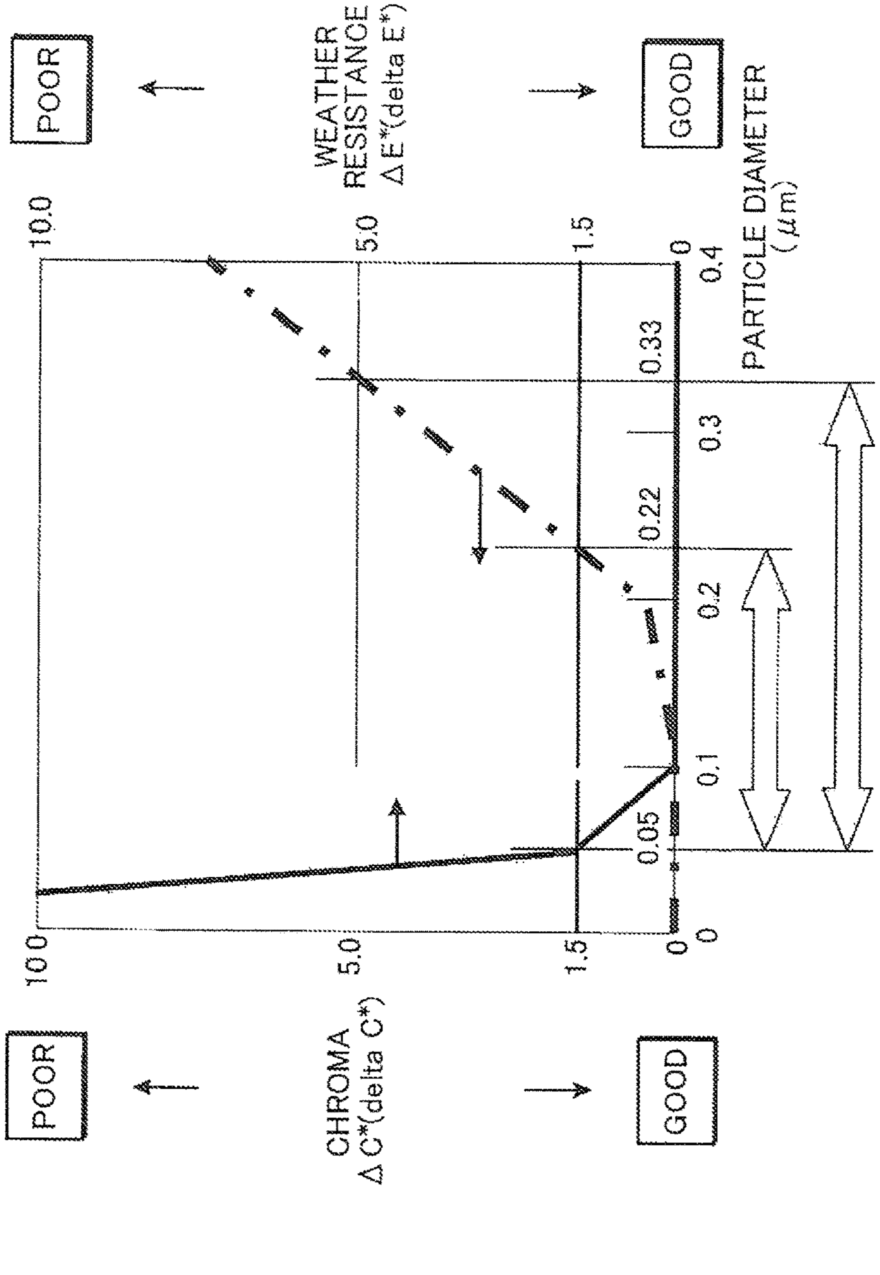

[Fig. 5]
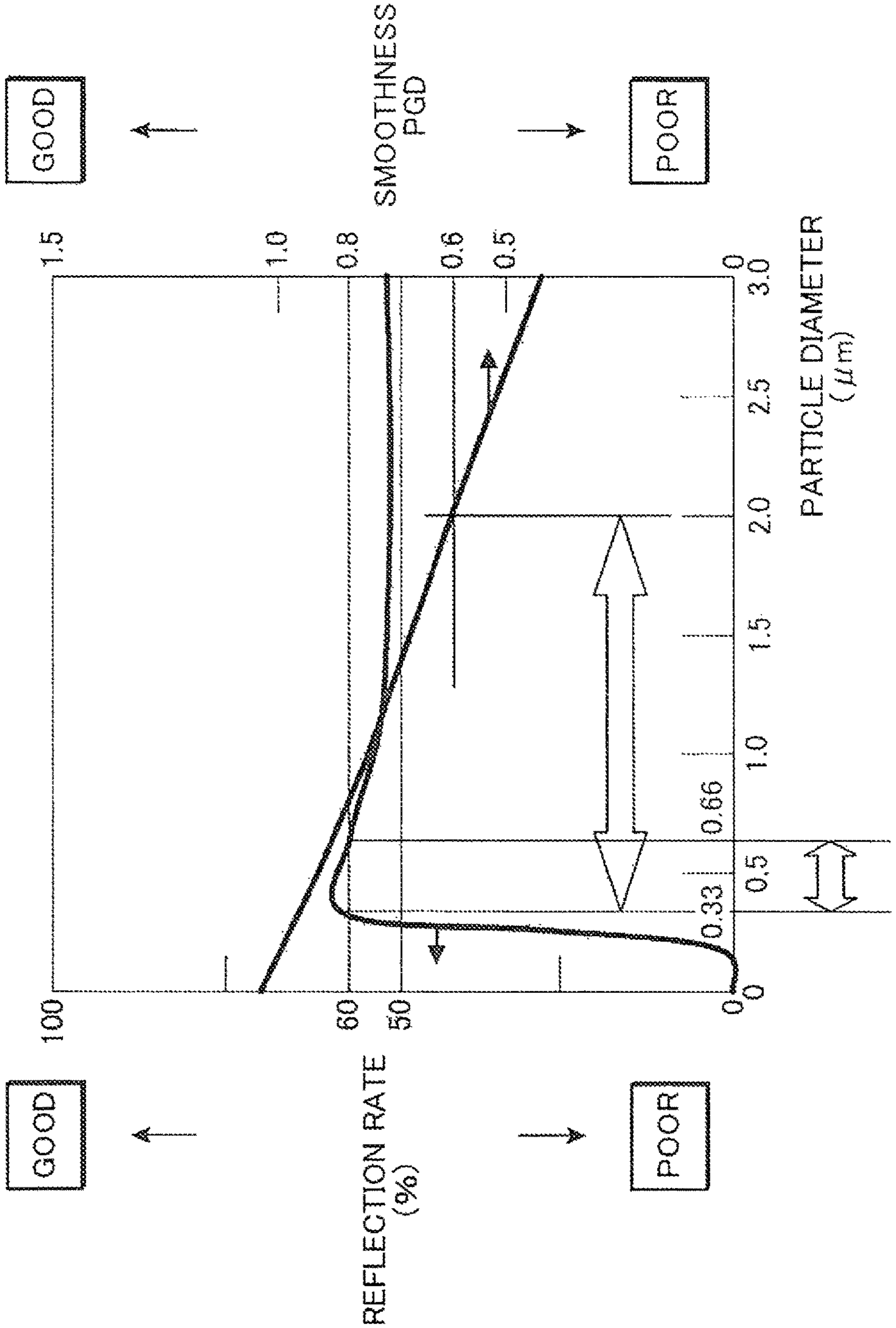

[Fig. 6]
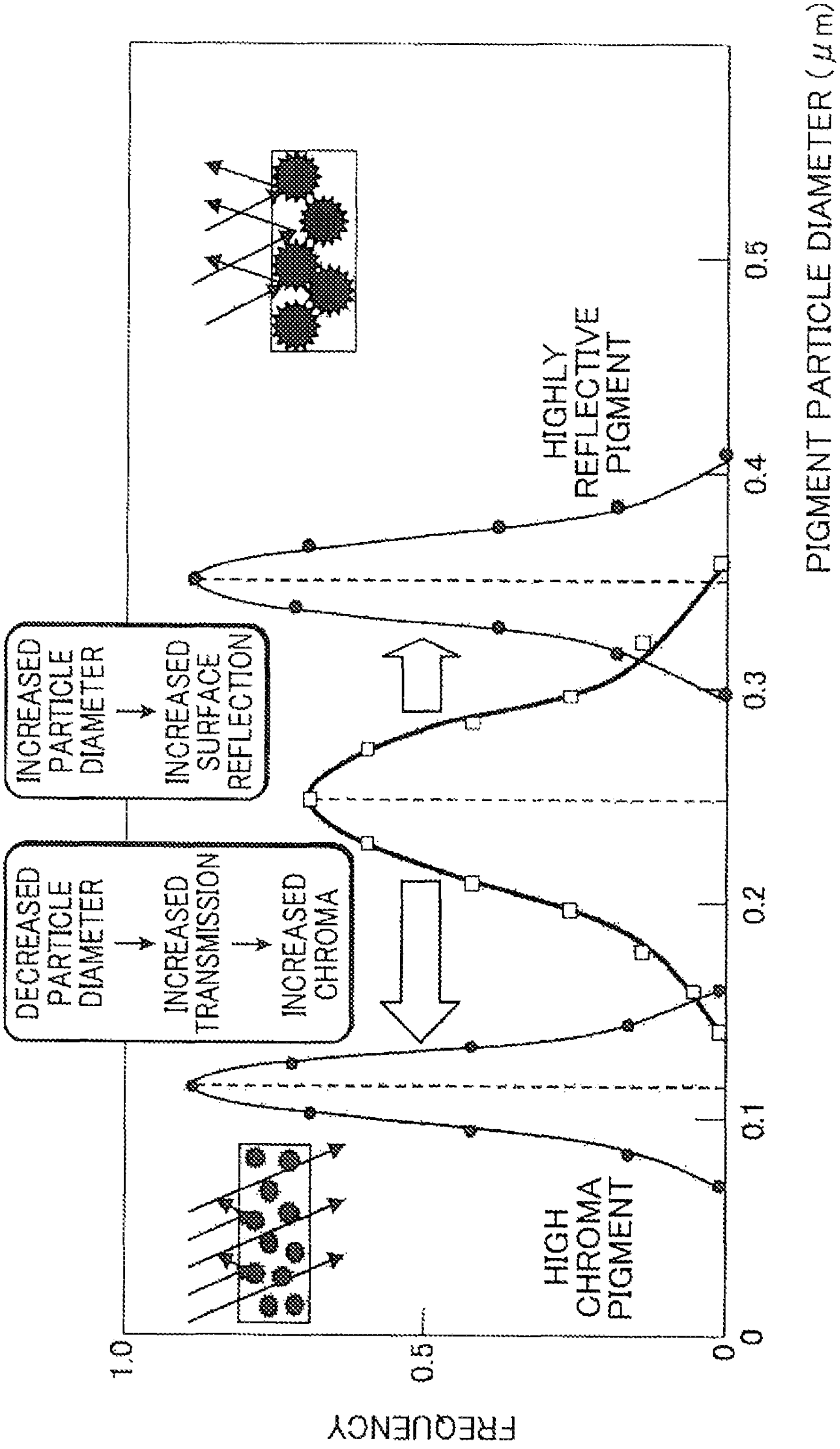

[Fig. 7]
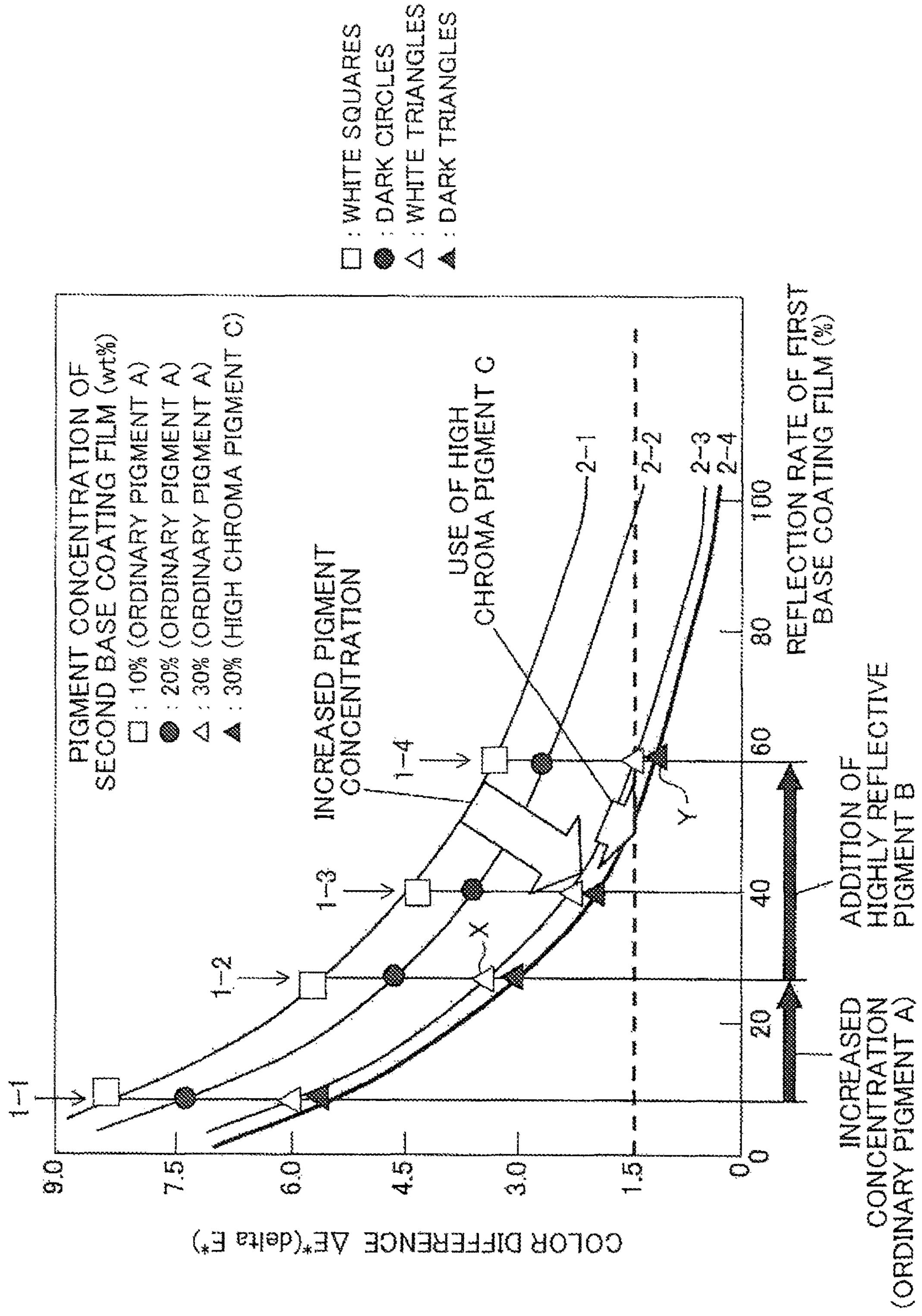

LAMINATED COATING FILM STRUCTURE

TECHNICAL FIELD

The present invention relates to a laminated coating film structure formed on a vehicle outer panel and the like.

BACKGROUND ART

In the case of coating metal parts such as vehicle outer panels that require weather resistance, a laminated coating film structure is typically employed in which, after forming a lower layer coating film (undercoating film) by electrodeposition coating for the purpose of preventing rust, an intermediate coating film having substrate hiding ability is formed thereon followed by laminating an upper layer coating film (top coating film) thereon. Although the intermediate coating film is provided to enhance light resistance, chipping resistance and coloring, from the viewpoints of conservation of resources, reduction of production steps, reduction of costs and the like, attempts have been made to directly laminate the upper layer coating film on the lower layer coating film without providing the intermediate coating film.

For example, Patent Document 1 (International Publication WO 96/33814) describes the coating of a first color base coat having substrate hiding ability onto a cationic electrodeposited coating film, coating a second color base coat having transparency on the coated film thereof without substantially curing, and heat-curing both color base coats followed by coating with a clear coating. It is described that this is carried out for the purpose of imparting a function of an intermediate coating film to the first color base coat, and that the pigment content is increased so that the light transmission rate of the coating film within a wavelength range of 400 to 700 nm is 5% or less. In addition, it is also described that the pigment content of the second color base coat is lower than the pigment content of the first color base coat. This is carried out to enable the color of the first color base coat to be able to be recognized through the coating film of the second color base coat due to the transparency thereof.

In the case of obtaining vivid coloring with a laminated coating film structure, an intermediate coating film d having good light reflection using a white pigment has conventionally been provided as shown in FIG. 1. Furthermore, FIG. 1 is a cross-sectional view schematically showing a laminated coating film structure having a conventional intermediate coating film in FIG. 1. In FIG. 1, a indicates a first layer coating film (base 1), b a second layer coating film (base 2), c a clear coating film, and e an electrodeposited coating film. With respect to this structure, in the case of laminating the first layer coating film a directly onto the electrodeposited coating film e without providing an intermediate coating as shown in FIG. 2, there is the problem of it being difficult to obtain vivid coloring. This is because the electrodeposited coating film e ends up absorbing light. Although it is possible to enhance light reflection of the electrodeposited coating film e, in this case, general-purpose electrodeposited coating films are unable to be used, thereby resulting in increased costs. Furthermore, FIG. 2 is a schematic diagram for explaining the case of enhancing pigment concentration of the first layer coating film in a laminated coating film structure not having an intermediate coating film.

Thus, it is necessary to impart substrate hiding ability to the first base coating film a as described in the above-mentioned Patent Document 1 in order to obtain vivid coloring without providing an intermediate coating film. As means for accomplishing this, the addition of an iridescent material (metallic pigment) such as aluminum flakes to the first base coating film a has been considered. However, when an iridescent material is incorporated in the first layer coating film a, hiding of the first layer coating material becomes inadequate at a typical thickness of about 10 um even if the pigment concentration in the second layer coating film b is increased to the maximum coatable concentration. Accordingly, it is difficult to obtain vivid coloring by incorporating an iridescent material in the first base coating film a. Note "um" stands for micro-meter unless otherwise specifically indicated.

In addition, there are additional problems required to be solved in order to obtain vivid coloring. This is readily understood by considering the mechanism by which pigment renders color. For example, in the case or red color, color is rendered as a result of light contacting the pigment, light or short and medium wavelengths being selectively reflected while light of long wavelengths is transmitted, after which the transmitted light is reflected at the surface of other pigment. This selective absorption of light by pigment does not allow the obtaining of adequate selective absorption effects in the case of selective absorption by a single pigment. Adequate selective absorption is only obtained by light passing through the pigment numerous times. A vivid red color can be obtained as a result of this selective absorption. If the pigment content of the coating film is excessively low, light of short and medium wavelengths is not adequately absorbed. As a result, instead of light of long wavelengths only, light of short and medium wavelengths is also reflected. A vivid red color is no longer obtained as a result of this light of short and medium wavelengths being reflected together with light of long wavelengths.

In contrast, enhancing the pigment concentration of a coating film is effective to a certain degree for improving substrate hiding ability and selective absorption and reflection of light. However, there are limitations on the extent to which vivid coloring can be obtained by enhancing the pigment concentration of a coating film. This is due to the reasons indicated below. Since the strength of a coating film is obtained by hardening a pigment with a resin, increasing the pigment concentration results in a corresponding decrease in the amount of resin. Consequently, if vivid coloring is attempted to be obtained by enhancing the pigment concentration of a coating film, it becomes difficult to ensure required coating film strength. Moreover, since coating film viscosity increases as the concentration of pigment increases, spray coating also becomes difficult. In addition, the use of dyes, which are coloring materials that dissolve in coating materials, has been considered instead of pigment. However, although dyes have satisfactory selective absorption properties, they have the problem of being susceptible to fading caused by ultraviolet light.

SUMMARY OF INVENTION

An object of the present invention is to obtain a laminated coating film structure that enables coloring of a specific color with two coating films consisting a first layer on the side close to a coated object and a second layer on the side far from the coated object, which allows the obtaining of satisfactory coloring without particularly increasing the thickness of the coating film.

One aspect of the present invention is a laminated coating film structure having a laminated coating film that renders a specific color on a coated object, wherein the laminated coating film is provided with a first layer arranged on the side near to the coated object and contains a pigment in which the mean particle diameter thereof is ½ or more the wavelength of the specific color but 2 um or less, and a second layer arranged on the side far from the coated object and contains a pigment in which the mean particle diameter thereof is 0.05 um or more but less than ½ the wavelength of the specific color.

Objects, characteristics, aspects and advantages of the present invention will be made clear by the following detailed description and appended drawings.

BRIEF DESCRIPTION OF DRAWINGS

FIG. 1 is a cross-sectional view schematically showing a conventional laminated coating film structure having an intermediate coating film;

FIG. 2 is a cross-sectional view schematically showing a laminated coating film structure in which pigment concentration of a first layer coating film has been enhanced without providing an intermediate coating film;

FIG. 3 is a cross-sectional view schematically showing a laminated coating film structure according to one embodiment of the present invention;

FIG. 4 is a graph indicating the relationships among pigment mean particle diameter, chroma and weather resistance;

FIG. 5 is a graph indicating the relationships among pigment mean particle diameter, reflection rate of a specific color of a coating film and coating film smoothness;

FIG. 6 is a graph indicating particle size distributions of various pigments; and, FIG. 7 is a graph indicating color differences between various samples and a reference sample.

DESCRIPTION OF EMBODIMENTS

With the foregoing in view, the inventors of the present invention conducted various studies while focusing on differences in light absorption and reflection within the same pigment attributable to particle diameter.

The inventors of the present invention surmised that differences in light absorption and reflection of a pigment attributable to particle diameter are the result of the factors described below. As was previously mentioned, the reason why a pigment renders a specific color is that the reflection rate of light of that pigment differs according to wavelength, with the pigment reflecting light of a wavelength of that specific color and absorbing light of other wavelengths. Thus, in the case of red color, for example, when light of short and medium wavelengths is efficiently absorbed by the pigment and light of longer wavelengths is efficiently reflected, vivid red color is rendered.

Here, the wavelength of a specific color refers to the wavelength at which spectral reflectance reaches a peak. Namely, this refers to a wavelength at which light that is radiated onto an object of a specific color and reflected becomes spectral light, and the spectral reflectance that is the reflection rate at each wavelength demonstrates a maximum value. In the case a specific color consists of a mixture of red, orange and yellow, within the visible wavelength range of 380 to 780 nm, the wavelength in the vicinity of a median value of a range in which wavelength increases from the wavelength at which spectral reflectance begins to increase accompanying an increase in wavelength to a maximum wavelength of 780 nm is the peak wavelength at which spectral reflectance demonstrates a maximum value. This wavelength is the specific color wavelength.

Since light is a type of electromagnetic wave and propagates by wave motion, when light a specific color wavelength propagates through a coating film, in plain terms, if light contacts the pigment while passing between the pigment particles, the light is reflected and selectively absorbed as it is transmitted through the particles. Light that passes between the particles is transmitted more easily the smaller the particle diameter of the pigment. In addition, light that passes through the pigment is also transmitted more easily the smaller the particle diameter of the pigment. As light of a specific color is transmitted through the pigment while passing between the pigment particles, since unnecessary wavelengths of light other than that of the specific color have a lower reflection rate than light of the wavelength of the specific color, that light is absorbed by the pigment. As a result, the specific color light has high chroma.

On the other hand, if particle diameter increases even for the same pigment, it becomes more difficult for light of a specific color wavelength to pass between the pigment particles. Namely, the light contacts the pigment particles and is separated into light that is reflected at the particle surface and light that enters the pigment. Light that contacts the pigment surface is reflected more easily. In addition, light that enters the pigment is unable to pass through the pigment particles, and is selectively absorbed in the vicinity of the particle surface layer. Accordingly, a specific color is rendered that does not have high chroma.

According to findings obtained through experiments and the like by the inventors of the present invention, if the particle diameter of a pigment is increased, when the particle diameter thereof has reached the vicinity of ½ of the wavelength of a specific color, the reflection rate of light of the specific color at the surface of the pigment particles reaches a maximum. Although the reflection rate decreases slightly as particle diameter of the pigment subsequently increases, the decrease is not large and a comparatively high reflection rate is obtained. This is thought to be the result of it becoming more difficult for light oscillating at a wavelength of the specific color to pass between the particle pigments as a result of being obstructed by the pigment when the pigment particle diameter increases, thereby making it easier for the light to be reflected at the pigment surface.

As is clear from the above explanation, the following is required for a coating film to vividly render a specific color. It is necessary for light of a specific color to not be reflected at locations close to the paint coating surface, and be transmitted to a certain degree through the coating film by passing between pigment particles. Moreover, when light of a color other than the specific color contacts the pigment particles, that light is required to be transmitted while being selectively absorbed, after which light of the specific color is required to be efficiently reflected without being absorbed.

The following provides an explanation of embodiments of the present invention based on the drawings. The following description of the preferred embodiments is essentially intended to be merely exemplary, and is not intended to limit the present invention, its application targets or its uses.

The laminated coating film structure according to the present embodiment has a laminated coating film that renders a specific color on a coated object, and the laminated coating film is provided with a first layer arranged on a side near the coated object and containing a pigment in which the mean particle diameter thereof is ½ or more the wavelength of the specific color but 2 um or less, and a second layer arranged on a side far from the coated object and containing a pigment in which the mean particle diameter is 0.05 um or more but less than ½ the wavelength of the specific color. Namely, in the laminated coating film structure disclosed herein, in that which attempts to render a specific color with both coating films consisting of a lower first layer and an upper second layer coated onto a coated object, the pigment for rendering the specific color of the first layer has a mean particle diameter that is ½ or more the wavelength of the specific color but 2 um or less, while the pigment for rendering the specific color of the second layer has a mean particle diameter of 0.05 um or more but less than ½ the wavelength of the specific color. Note "um" stands for micro-meter unless otherwise specifically indicated.

As a result, in a coating film of the upper second layer having a small pigment particle diameter, light of a wavelength other than that of the specific color is selectively absorbed while light of the wavelength of the specific color is easily transmitted. Since light of unwanted color wavelengths is absorbed in the coating film of the second layer, a specific color of high chroma can be obtained. In the coating film of the lower first layer, since pigment particle diameter is large and the reflectivity of light of a wavelength of the specific color is good, the lightness of the resulting specific color increases. Naturally, in the coating film of the first layer as well, light of unwanted color wavelengths is absorbed, and as a result thereof, chroma of the reflected specific color increases. As a result, according to the laminated coating film structure described above, a vivid specific color can be rendered without increasing coating film thickness.

Furthermore, the laminated coating film structure according to the present invention uses the wavelength of a specific color rendered by the ultimately obtained laminated coating film structure, namely the wavelength of the target exterior color as a reference for the mean particle diameter of the pigment respectively contained in the first layer and the second layer. In addition, in a structure that uses wavelength of the exterior color as a reference, the specific color exhibits a spectral reflectance distribution for each wavelength in the case of being based on wavelength. The mean particle diameter of the pigment respectively used for the first layer and the second layer is adjusted corresponding to the exterior color of the laminated coating film structure.

In addition, although pigment becomes less advantageous in terms of weather resistance as the particle diameter thereof becomes smaller (and is particularly susceptible to degradation by ultraviolet light), as a result of making the mean particle diameter of the pigment of the second layer 0.05 um or more, it does not impair the ensuring of adequate weather resistance. In addition, although smoothness of the coating film decreases as particle diameter of the pigment increases, as a result of making the mean particle diameter of the pigment of the first layer 2 um or less, a satisfactory coating film exterior is obtained.

The mean particle diameter of the pigment of the second layer is preferably 0.05 um or more but less than ⅓ of the wavelength of the specific color in order to selectively allow light of the wavelength of the specific color to be transmitted. In addition, the laminated coating film structure is particularly effective for rendering a chromatic color.

In a preferable embodiment, an electrodeposited coating film is formed on the surface of the coated object, and a coating film of the first layer is formed to as to be directly layered on the surface of the electrodeposited coating film. In addition, in a more preferable embodiment, a coating film of the second layer is formed to as to be directly layered on the surface of the coating film of the first layer. However, a laminated coating film structure provided with a coating film such as an intermediate coating film other than the coating films of the first layer and the second layer is also included in the present invention provided that this intermediate coating film and the like is not involved in the ultimate coating film color, and the specific color is exclusively demonstrated by both coating films of the first layer and the second layer.

FIG. 3 shows a laminated coating film configuration according to the present invention. In FIG. 3, reference symbol 1 indicates a coated object made of steel, an electrodeposited coating film 2 is formed on the surface thereof as a lower layer coating film, a base coating film 3 is formed thereon, and a clear coating film 4 is formed thereon. The base coating film 3 and the clear coating film 4 compose an upper layer coating film. The base coating film 3 is formed by coating a base coating material in two stages, and is composed of a lower first base coating film (first layer) 3*a* obtained with the first stage base coating material, and an upper second base coating film (second layer) 3*b* obtained with the second stage base coating material. Furthermore, FIG. 3 is a cross-sectional view schematically showing a laminated coating film structure according to one embodiment of the present invention, and hatching of the electrodeposited coating film 2, the base coating film 3 and the clear coating film 4 has been omitted.

This laminated coating film configuration has the characteristics indicated below. First, there is no intermediate coating film like that of the laminated coating film structure shown in FIG. 1, with the first base coating film 3*a* being over-coated directly onto the surface of the electrodeposited coating film 2. In addition, a highly reflective pigment 5 having a large mean particle diameter is employed for the first base coating film 3*a*, and a high chroma pigment 6 having a small mean particle diameter is employed for the second base coating film 3*b*.

The following provides a detailed explanation.

<Electrodeposited Coating Film 2>

The electrodeposited coating film 2 can be precipitated and formed on the side of the coated object 1 by immersing the coated object 1 in a cationic electrodeposition coating material, using the coated object 1 as an anode and using an electrode plate within the electrodeposition tank as a cathode, and applying a direct current there between. The cationic electrodeposition coating material contains a cationic epoxy resin, curing agent, pigment and additives.

The cationic epoxy resin contains an amine-modified epoxy resin. Examples of epoxy resins that can be used include those modified with a polyester polyol, polyether polyol or alkyl phenol, as well as those in which chain length of the epoxy resin has been extended.

Examples of curing agents that can be used include block isocyanates obtained by blocking a polyisocyanate with a blocking agent. Examples of polyisocyanates include aliphatic, alicyclic and aromatic-aliphatic polyisocyanates. Examples of blocking agents include lactam-based blocking agents such as ε-caprolactam and oxime-based blocking agents such as formaldoxime.

The electrodeposition coating material typically contains pigment as coloring agent. Examples of coloring pigments include titanium oxide, carbon black and iron oxide, examples of extender pigments include kaolin, talc, aluminum silicate, calcium carbonate, mica and clay, and examples of rust preventive pigments include zinc phosphate, iron phosphate, aluminum phosphate, calcium phosphate, zinc oxide, aluminum tripolyphosphate, zinc molybdate, aluminum molybdate and calcium molybdate. The amount of pigment can be within the range of 10 to 30% by weight based on the solid component of the electrodeposition coating material composition.

<Base Coating Film 3>

The base coating film 3 can be formed by coating an aqueous base coating material or oily (solvent-based) base coating material. With respect to an aqueous base coating material, acrylic resin, polyester resin, polyurethane resin or vinyl resin and the like can be used for the aqueous resin serving as the main component thereof.

The acrylic resin is composed of an acrylic emulsion or water-soluble acrylic resin and the like. The acrylic emulsion is produced by emulsion polymerization, suspension polymerization or diffusion polymerization and the like using a polymerizable unsaturated monomer. Examples of polymerizable unsaturated monomers include hydroxyl group-containing polymerizable unsaturated monomers, carboxyl group-containing polymerizable unsaturated monomers, aminoalkyl acrylates, aminoalkyl methacrylates, acrylamides, methacrylamides and derivatives thereof, sulfoalkyl acrylates, polyvinyl compounds, and ultraviolet-absorbing or ultraviolet-stabilizing polymerizable unsaturated monomers.

Examples of water-soluble acrylic resins include carboxyl group-containing polymerizable unsaturated monomers and nonionic polymerizable unsaturated monomers having a polyoxyalkylene chain. Examples of carboxyl group-containing polymerizable unsaturated monomers include examples of polymerizable unsaturated monomers of the previously described acrylic emulsions. Examples of nonionic polymerizable unsaturated monomers having a polyoxyalkylene chain include polyethylene glycol acrylate, polyethylene glycol methacrylate, polypropylene glycol acrylate and polypropylene glycol methacrylate.

Water solubility or water dispersibility is imparted to the polyester resin by neutralizing the carboxyl groups with a basic neutralizing agent. Examples of carboxyl group-containing polyester resins include those obtained by esterifying a polybasic acid component and a polyvalent alcohol component under conditions such that the carboxyl groups are in excess with respect to the hydroxyl groups, and those obtained by reacting an acid anhydride with a polyester polyol obtained by reacting a polybasic acid component and a polyvalent alcohol component under conditions such that the hydroxyl groups are in excess with respect to the carboxyl groups. Examples of the basic neutralizing agents include inorganic bases and amines.

Pigment is added to the aqueous base coating material as coloring agent. Examples of coloring agents include organic pigments such as azochelate pigments, insoluble azo pigments, condensed azo pigments, diketopyrrolopyrolle pigments, benzoimidazolone pigments, phthalocyanine pigments, indigo pigments, perinone pigments, perylene pigments, dioxane pigments, quinacridone pigments, isoindolinone pigments or metal complex pigments, and inorganic pigments such as chrome yellow, yellow iron oxide, red iron oxide, carbon black and titanium dioxide. Moreover, an extender pigment such as calcium carbonate, barium sulfate, clay or talc, or an iridescent pigment, may also be used in combination.

A coating material additive such as a crosslinking agent, flat pigment, curing catalyst, thickener, organic solvent, basic neutralizing agent, ultraviolet absorber, photostabilizer, surface conditioner, antioxidant or silane coupling agent can be incorporated in the aqueous base coating material as necessary.

A crosslinking agent is a compound capable of forming a cured coating film by reacting with a crosslinking functional group such as a hydroxyl group, carboxyl group or epoxy group in an aqueous resin, and examples of crosslinking agents include melamine resin, polyisocyanate compounds, blocked polyisocyanate compounds, epoxy group-containing compounds, carboxyl group-containing compounds and carbodiimide group-containing compounds.

The aqueous base coating material can be coated onto the electrodeposited coating film 2 of the coated object 1 by, for example, air spray coating, airless spray coating, rotary atomization coating or curtain coating, and static electricity may be applied. The first base coating film 3*a* and the second base coating film 3*b* are respectively coated to a dry film thickness of 8 to 12 um. After coating, the coating films may be pre-heated for about 1 to 15 minutes at about 40 to 100 degrees Celsius in order to evaporate moisture present in the coating films.

<Clear Coating Film 4>

Although there are no particular limitations on the resin used to form the clear coating film, examples include combinations of acrylic resin and/or polyester resins and amino resins, and acrylic resins and/or polyester resins having a carboxylic acid-epoxy curing system. For example, a two-liquid urethane clear coating material contains a hydroxyl group-containing acrylic resin and a polyisocyanate compound. Examples of organic solvents include hydrocarbon-based solvents, ester-based solvents, ketone-based solvents, alcohol-based solvents, ether-based solvents and aromatic petroleum-based solvents.

A pigment, non-water-dispersible resin, polymer fine particles, curing catalyst, ultraviolet absorber, photostabilizer, coated surface conditioner, antioxidant, fluidity conditioner or wax and the like can be suitably contained in the clear coating material as necessary. Examples of curing catalysts include organic tin compounds, triethylamine and diethanolamine. Examples of ultraviolet absorbers include benzophenone, benzotriazole, cyanoacrylate, salicylate and anilide oxalate-based compounds, as well as ultraviolet stabilizers such as hindered amine compounds.

The clear coating material can be coated onto the base coating film 3 by airless spraying, air spraying or a rotary atomization coater and the like, and static electricity may be applied during coating. After coating to a dry film thickness of 35 to 40 um, the coating film is cured by heating for 20 minutes at 140 degrees Celsius.

<Pigment of Base Coating Film>

As was previously explained, light absorption and reflection properties differ according to particle diameter of the pigment even for the same coloring pigment. Namely, when light of the wavelength of a specific color propagates through a coating film, in plain terms, the light passes between the pigment particles. Light of the wavelength of a specific color passes through more easily the smaller the particle diameter of the pigment (good transmission). During the course of passing between the pigment particles, unnecessary wavelengths of light other than that of the specific color are absorbed by the pigment (chroma increases). On the other hand, as particle diameter of the pigment increases, it becomes more difficult for light of the wavelength of a specific color to pass between the pigment particles. Namely, the light is more easily reflected by the surface of the pigment particles (good reflectivity).

The present invention serves to increase chroma by enhancing transmission of light of a specific color in the upper second base coating film 3*b*, and serves to increase lightness by enhancing reflectivity of light of a specific color in the lower first base coating film 3*a*. Consequently, in the present invention, pigment particle diameter is optimized for the first base coating film 3*a* and the second base coating film 3*b*, respectively.

<<Pigment Particle Diameter of Second Base Coating Film 3*b*>>

An explanation is first provided of optimization of pigment particle diameter of the second base coating film 3*b*.

FIG. 4 indicates the relationship between pigment mean particle diameter and delta C* (chroma difference of L*C*h* color chart) serving as an indicator of chroma. Red pigment (True Red) having a peak wavelength of 660 nm was used for the pigment. Namely, various samples of pigment of the second base coating film 3*b* having different mean particle diameters were prepared, and the chroma difference (delta C*) with a separately prepared coated plate having a chroma C* of 60 was measured using the GSP-2 color difference meter manufactured by Murakami Color Research Laboratory. Furthermore, delta C* refers to a difference in chroma representative of color vividness, and here, is the difference with a chroma C* of 60. Delta C* is a value that complies with JIS Z 8730 and more specifically, is the difference in ab chroma (C*ab) between two object colors in the L*a*b* color chart. In addition, ab chroma is a value that complies with JIS Z 8729, and more specifically, is defined by the equation indicated below.

$$C^*ab=[(a^*)^2+(b^*)^2]^{1/2}$$

The samples were prepared by sequentially carrying out electrodeposition coating (main component: epoxy resin, coating film thickness: 18 um), first base coating (aqueous, main component: acrylmelamine resin, coating film thickness: 10 um), second base coating (aqueous, main component: acrylmelamine resin, coating film thickness: 10 um) and clear coating (main component: acrylurethane resin, coating film thickness: 35 um) on a steel plate. The pigment concentrations of the first base coating film 3*a* and the second base coating film 3*b* were both 30% by weight. The mean particle diameter of the pigment of the first base coating film 3*a* was 0.4 um.

According to FIG. 4, as the mean particle diameter of the pigment decreases, delta C* also decreases, or in other words, chroma increases. If the mean particle diameter of the pigment is less than ½ the peak wavelength according to that pigment color (0.33 um), a comparatively high chroma can be seen to be obtained, and while the chroma becomes particularly high if the mean particle diameter of the pigment is less than ⅓ the peak wavelength (0.22 um). This is thought to be due it becoming easier for the light to pass between the pigment particles if the particle diameter of the pigment is ½ or less the peak wavelength.

FIG. 4 also shows the relationship between pigment mean particle diameter and delta E*(color difference of L*C*h* color chart) serving as an indicator of weather resistance. This delta E* is the color difference before and after testing consisting of an accelerated weather resistance test equivalent to an Okinawa exposure test (3 years) in compliance with JASO M 351 (accelerated weather resistance test of automotive exterior parts using a xenon arc lamp) using a xenon weather meter carried out for each of the samples of the above-mentioned pigment having different mean particle diameters. The previously described GSP-2 color difference meter was used to measure this color difference. Furthermore, delta E* refers to the value obtained by numerically representing the difference in color perceived between two colors. In this case, the difference in color perceived before and after testing was numerically represented. Delta E* is a value that complies with JIS Z 8730, and more specifically, is delta E*ab in the L*a*b* color chart that is defined with the equation indicated below.

$$\text{delta } E^*ab=[(\text{delta } L^*)^2+(\text{delta } a^*)^2+(\text{delta } b^*)^2]^{1/2}$$

According to FIG. 4, as the mean particle diameter of the pigment decreases, delta E* increases and weather resistance becomes poor. In particular, if the mean particle diameter is smaller than 0.05 um, weather resistance worsens dramatically. This is thought to be due to deterioration of the pigment (color fading) caused by ultraviolet light.

On the basis of the above, from the viewpoint of increasing the chroma of rendered colors, the mean particle diameter of the pigment of the second base coating film 3*b* was determined to preferably less than ½ and more preferably less than ⅓ the wavelength of a specific color. In addition, from the viewpoint of weather resistance, the mean particle diameter of the second base coating film 3*b* was determined to preferably be 0.05 um or more.

<<Pigment Particle Diameter of First Base Coating Film 3*a*>>

The following provides an explanation of optimization of the pigment particle diameter of the lower first base coating film 3*a*.

FIG. 5 indicates the relationship between pigment mean particle diameter and the reflection rate of light of a color to be rendered by the pigment. Red pigment (True Red) having a peak wavelength of 660 nm was used for the pigment, and the reflection rate of the light having a peak wavelength of 660 nm was measured with a spectrophotometer for each of the samples in which the mean particle diameter of the pigment of the base coating film was changed. The samples were prepared by sequentially carrying out electrodeposition coating (main component: epoxy resin, coating film thickness: 18 um), base coating (aqueous, main component: acrylmelamine resin, coating film thickness: 10 um) and clear coating (main component: acrylurethane resin, coating film thickness: 35 um) on a steel plate.

According to FIG. 5, as the mean particle diameter of the pigment increases, the reflection rate of light according to that pigment color increases, and the reflection rate reaches a maximum when the particle diameter thereof approaches ½ the peak wavelength (0.33 um). Although the reflection rate decreases slightly as the particle diameter of the pigment subsequently increases, the decrease is not large and a comparatively high reflection rate is obtained.

Here, a high reflection rate of light according to the pigment color of the first base coating film 3*a* means that the amount of light of that pigment color that is absorbed by the electrodeposited coating film 2 beneath the first base coating film 3*a* is small, and thus, color rendering of high lightness is obtained.

FIG. 5 also indicates the relationship between particle mean particle diameter and PGD value serving as an indicator of smoothness of the coating film surface. Namely, the appearance of the clear coating film surface of the samples used to measure reflection rate as described above was evaluated by measuring using a PGD distinctness of image glossimeter (PGD-IV manufactured by the Japan Color Research Institute). Furthermore, the PDG value is in indicator of distinctness of an image depicted on a surface of a measurement target, and the larger the value thereof, the higher the degree of distinctness of the image. A high degree of distinctness of an image depicted on the surface of a measurement target indicates high smoothness of the surface of the measurement target. PDG values become smaller as the mean particle size of a pigment increases. Namely, the smoothness of the coating film surface decreases. If the mean particle diameter of the pigment is 2 um or less, a coating film of a favorable appearance is obtained that has a PDG value of 0.6 or more, and if the mean particle diameter is 0.5 um or less, a coating film of a favorable appearance is obtained that has a PGD value of 0.8 or more.

On the basis of the above, it can be said that, from the viewpoint of improving lightness of color rendering, the mean particle diameter of pigment of the first base coating film 3*a* is preferably ½ or more of the wavelength of a specific color, and from the viewpoint of smoothness of the coating film surface, the mean particle diameter is preferably 2 um or less and particularly preferably 0.5 um or less.

FIG. 6 shows an example of the size distributions of the red pigment (True Red) having the peak wavelength of 660 nm used in the base coating film 3. Namely, as shown in FIG. 6, the particle size distribution of a conventional pigment has a peak at 0.25 um, for example. When a composition is employed that has a peak within a particle diameter range of 0.08 um and ¼ or less the peak wavelength, coating film transmission of light of the peak wavelength improves accompanying a decrease in the particle diameter, and the chroma of rendered color increases. On the other hand, if a composition is employed in which the above-mentioned particle size distribution has a peak within a particle diameter range of ½ or more of the peak wavelength and 0.40 um or less, the reflection rate of light of the peak wavelength at the pigment surface increases accompanying an increase in the particle diameter.

Furthermore, volume mean particle diameter is used for the mean particle diameter. Volume mean particle diameter can be measured using laser diffraction or centrifugal sedimentation and the like. More specifically, measurement using laser diffraction can be carried out by, for example, using a laser diffraction particle analyzer (MT3300EXII Microtrack Particle Size Distribution Analyzer manufactured by Nikkiso Co., Ltd.) that complies with JIS Z 8825-1 (laser diffraction for particle size analysis). If measurement is carried out using this device, the particles to be measured (pigment) are first irradiated with a laser to obtain a scattering pattern of the laser light. The volume distribution of the measured particles can then be obtained from the resulting scattering pattern by using data indicating the correlation between the scattering pattern and the volume distribution of spherical particles.

Furthermore, volume distribution can be converted to number distribution by carrying out prescribed arithmetic processing using software, for example. In the case the measured particles are particles having the same specific gravity such as single pigment particles, the particles can be assumed to be spherical, and volume distribution and number distribution have nearly the same distribution. For example, with respect to the distributions shown in FIG. 6, volume distribution can also be said to be number distribution since the above-mentioned assumption is valid, and the distributions are normal distributions. In the case of normal distribution in this manner, the maximum peak value is the mode diameter (most frequent particle diameter), the volume mean particle diameter, and the median diameter.

<Evaluation of Laminated Coating Film Performance>

The ordinary pigment A of a particle size distribution having a peak at 0.25 um, a highly reflective pigment B of a particle size distribution having a peak at 0.35 um (mean particle diameter: 0.35 um), and a high chroma pigment C of a particle size distribution having a peak at 0.11 um (mean particle diameter: 0.11 um) were prepared for use as pigments of the base coating film, as shown in FIG. 6. These pigments A, B and C were all red pigments (True Red) having a peak wavelength of 660 nm. For the first base coating film, four types of first base coating materials (aqueous acrylmelamine coating materials) consisting of 1-1 to 1-4 were prepared having the pigment blends and pigment concentrations shown in Table 1. In addition, for the second base coating film, four types of second base coating materials (aqueous acrylmelamine coating materials) consisting of 2-1 to 2-4 were prepared having the pigment blends and pigment concentrations shown in Table 2. Furthermore, the pigment concentrations indicate the concentrations in coating films after baking.

TABLE 1

| FIRST BASE COATING MATERIAL | 1-1 | 1-2 | 1-3 | 1-4 |
|---|---|---|---|---|
| PIGMENT RATIO (WT %) | | | | |
| ORDINARY PIGMENT A | 100 | 100 | 50 | 0 |
| HIGHLY REFLECTIVE PIGMENT B | 0 | 0 | 50 | 100 |
| PIGMENT CONCENTRATION (WT %) | 20 | 30 | 30 | 30 |
| REFLECTION RATE (%) | 7.8 | 24.3 | 40.0 | 58.9 |

TABLE 2

| SECOND BASE COATING MATERIAL | 2-1 | 2-2 | 2-3 | 2-4 |
|---|---|---|---|---|
| PIGMENT RATIO (WT %) | | | | |
| ORDINARY PIGMENT A | 100 | 100 | 100 | 0 |
| HIGH CHROMA PIGMENT C | 0 | 0 | 0 | 100 |
| PIGMENT CONCENTRATION (WT %) | 10 | 20 | 30 | 30 |
| COLOR MEASUREMENT ON WHITE COATED SUBSTRATE | | | | |
| LIGHTNESS (L*) | 38.4 | 36.7 | 39.9 | 42.5 |
| CHROMA (C*) | 75.1 | 74.8 | 72.4 | 81.2 |

A total Of 16 types of samples were prepared having different compositions for the base coating film 3 by combining the first base coating materials (4 types) and the second base coating materials (4 types). All the samples were composed by laminating a first base coating film, a second base coating film and a clear coating film consisting of an acrylurethane coating material on an epoxy-based electrodeposited coating film on the surface of a steel plate (without an intermediate coating). After sequentially carrying first base coating and second base coating on the electrodeposited coating film and preheating, clear coating was carried out followed by baking for 20 minutes at 140 degrees Celsius. The thicknesses of the coating films were 18 um for the electrodeposited coating film, 10 um for the first base coating film and second base coating film, and 35 um for the clear coating film. In addition, the lightness (L*) of the electrodeposited coating film was 50 plus or minus 3. Furthermore, lightness (L*) refers to color brightness and an example thereof is a value obtained in compliance with JIS Z 8729. In addition, lightness (L*) demonstrates a high correlation with light reflection rate when light is radiated onto an object.

In addition, a reference sample was prepared to evaluate the performance of the laminated coating films of each of the samples. The reference sample employed a composition in which an intermediate coating film using a white pigment (main component: polyester melamine resin), an oily base coating film using ordinary pigment A (main component: acrylmelamine resin), and a clear coating film (main component: acid epoxy-curable acrylic resin) were laminated onto an epoxy-based electrodeposited coating film on the surface of a steel plate. The thicknesses of the coating films were 18 um for the electrodeposited coating film, 25 um for the intermediate coating film, 10 um for the base coating film and 35 um for the clear coating film. In addition, the pigment concentration of the intermediate coating film was 45% by weight, and the pigment concentration of the base coating film was 30% by weight.

The color difference (delta E*) between the 16 types of samples and the reference sample was measured using the GSP-2 color difference meter manufactured by Murakami Color Research Laboratory at an incidence angle of 45 degrees and an acceptance angle of −80 to 80 degrees (variable angle: 5 degrees). The results are shown in FIG. 7.

Here, the reference sample corresponds to a conventional product, and since it has an intermediate coating film of white pigment, even though ordinary pigment A is used for the base coating film, red color is vividly rendered by the laminated coating film. In contrast, since the 16 types of samples do not have an intermediate coating film, they are correspondingly disadvantageous in terms of rendering a vivid red color. FIG. 7 indicates the degree to which the 16 types of samples render vivid red color in comparison with the reference sample.

According to FIG. 7, even in the case of using the ordinary pigment A in the second base coating film, if the concentration of that pigment is increased, the value of color difference (delta E*) can be seen to decrease (in the order of 1) white squares, 2) dark circles, and 3) white triangles). In addition, even in the case of using the ordinary pigment A in the first base coating film, when the concentration of that pigment increases, the reflection rate can be seen to increase and the value of color difference (delta E*) can be seen to become smaller. However, there are limitations on the extent to which coating film strength can be maintained by increasing the pigment concentration of the base coating film (for example, about 30% by weight). Thus, there are limitations on the degree to which color difference (delta E*) can be decreased by increasing the pigment concentration of the base coating film. More specifically, the value of color difference (delta E*) of sample X in FIG. 7 (combination of first base coating material 1-2 and second base coating material 2-2) is about 3.5 and comparatively large.

In contrast, line 2-4 of FIG. 7 that uses the high chroma pigment C in the second base coating film has a smaller color difference (delta E* than line 2-3 of FIG. 7 in which pigment concentration has simply been increased. This indicates that pigment particle diameter decreases and coating film transmission of red light improves, thereby demonstrating the effect of facilitating absorption of unwanted colors of light by the pigment. In addition, lines 1-3 and 1-4 of FIG. 7, in which the highly reflective pigment B has been added to the first base coating film, color difference (delta E* is even smaller than line 1-2 of FIG. 7 in which pigment concentration has simply been enhanced. This indicates that pigment diameter has increased, thereby resulting in the effect of improving reflectance of red color at the pigment surface.

In sample Y (combination of first base coating material 1-4 and second base coating material 2-4), in which the highly reflective pigment B was used for the pigment of first base coating film and the high chroma pigment C was used for pigment of the second base coating film, color difference (delta E*) was less than 1.5, thus demonstrating that vivid color rendering is obtained that is comparable to that of the reference sample.

<Case of Pigments of Other Colors>

The results of the studies described above were obtained by examining color rendering using red color having a peak wavelength of 660 nm as the specific color with the first base coating film and the second base coating film. Therefore, the following provides an explanation of pigment particle diameter in the case of generating other colors as specific colors with both base coating films. In this case as well, the mean particle diameter of the pigment can be determined based on the peak wavelength of that specific color in the same manner as in the case of red pigment. Namely, the same study is conducted with the exception of changing the pigment particle diameter. The following indicates examples of this.

In the case of rendering blue color having a peak wavelength of 450 nm, the mean particle diameter of the blue pigment of the first base coating film is 0.225 to 2 um, and the mean particle diameter of the blue pigment of the second base coating film is 0.05 to less than 0.225 um.

In the case of rendering green color having a peak wavelength of 550 nm, the mean particle diameter of the green pigment of the first base coating film is 0.275 to 2 um, and the mean particle diameter of the green pigment of the second base coating film is 0.05 to less than 0.275 um.

In the case of rendering yellow color having a peak wavelength of 580 nm, the mean particle diameter of the yellow pigment of the first base coating film is 0.290 to 2 um, and the mean particle diameter of the yellow pigment of the second base coating film is 0.05 to less than 0.290 um.

Although the present description discloses various aspects of technology as has been previously described, the primary technology there within is summarized below.

One aspect of the present invention is a laminated coating film structure having a laminated coating film that renders a specific color on a coated object, wherein the laminated coating film is provided with a first layer arranged on the side close to the coated object and containing a pigment in which the mean particle diameter is ½ or more the wavelength of the specific color but 2 um or less, and a second layer arranged on the side far from the coated object and containing a pigment in which the mean particle diameter is 0.05 um or more but less than ½ the wavelength of the specific color.

According to this configuration, in the laminated coating film structure in which a specific color is made to be rendered by both coating films of a first layer on the side close to the coated object and a second layer on the side far from the coated object, satisfactory color rendering can be obtained without particularly increasing the thickness of the coating films.

In addition, the laminated coating film structure is made to render the specific color with both coating films of the first layer and the second layer.

In addition, in the laminated coating film structure, the mean particle diameter of the pigment contained in the second layer is preferably 0.05 um or more but less than ⅓ the wavelength of the specific color.

According to this configuration, even better color rendering can be obtained.

In addition, in the laminated coating film structure, the specific color is preferably a chromatic color. By adjusting the particle diameters of the pigments contained in each of the first layer and the second layer, the effect of allowing the obtaining of satisfactory color rendering can be more effectively demonstrated without particularly increasing the thickness of the coating films.

In addition, in the laminated coating film structure, the second layer is preferably in direct contact with the first layer.

In addition, in the laminated coating film structure, an electrodeposited coating film is preferably provided between the coated object and the first layer.

In addition, in the laminated coating film structure, the first layer is preferably in direct contact with the electrodeposited coating film.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

INDUSTRIAL APPLICABILITY

According to the present invention, a laminated coating film structure can be obtained that allows the obtaining of vivid coloring without particularly increasing the thickness of coating films, while also having favorable weather resistance and appearance of the coating film.

The invention claimed is:

1. A laminated coating film structure, having a laminated coating film that renders a specific color on a coated object and an electrodeposited coating film, wherein the laminated coating film is provided with:

a first layer arranged on a side close to the coated object and containing a pigment in which the mean particle diameter is ½ or more of the wavelength of the specific color but 2μm or less; and a second layer arranged on a side far from the coated object and containing a pigment in which the mean particle diameter is 0.05 μm or more but less than ⅓ of the wavelength of the specific color, wherein: the electrodeposited coating film is provided between the coated object and the first layer;

the first layer is in direct contact with the electrodeposited coating film;

the second layer is in direct contact with the first layer;

the first layer has a thickness of 8 to 12 μm;

the second layer has a thickness of 8 to 12 μm;

a pigment concentration of the first layer is 20 to 30% by weight;

a pigment concentration of the second layer is 10 to 30% by weight;

the specific color is rendered by both coating films of the first layer and the second layer; and the specific color is a chromatic color.

2. The laminated coating film structure according to claim 1, wherein a clear coating film is provided on the second layer, and the clear coating film is in direct contact with the second layer.

3. The laminated coating film structure according to claim 1, wherein the mean particle diameter of the pigment contained in the first layer is ½ or more of the wavelength of the specific color but 0.5 μm or less.

4. The laminated coating film structure according to claim 1, wherein the coated object is a vehicle outer panel.

* * * * *